(No Model.) 3 Sheets—Sheet 1.

N. H. DAVIS.
DIE FOR MAKING CAR SPRING PLATES.

No. 378,773. Patented Feb. 28, 1888.

Witnesses:
A. P. Jennings.
L. Douville

Inventor:
Nathan H. Davis
By Niederoheim & Kintner
Attorneys.

(No Model.) 3 Sheets—Sheet 2.
N. H. DAVIS.
DIE FOR MAKING CAR SPRING PLATES.
No. 378,773. Patented Feb. 28, 1888.
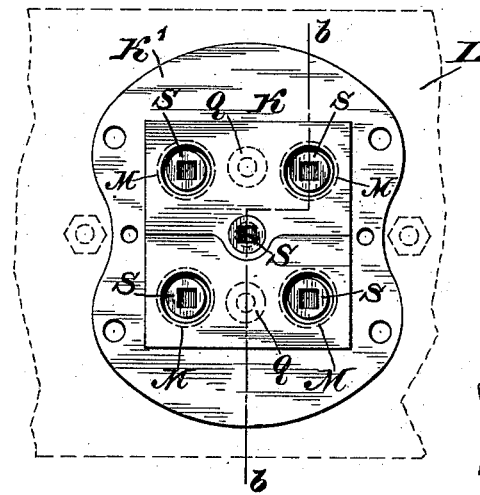
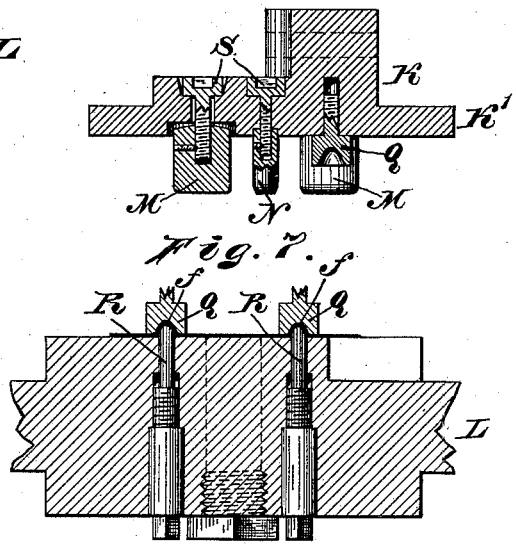
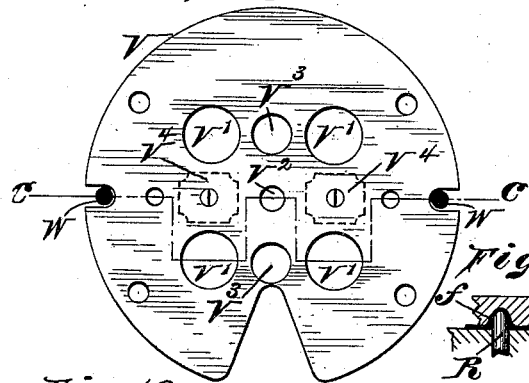
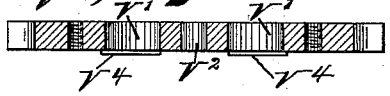
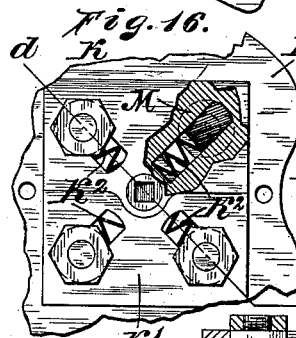
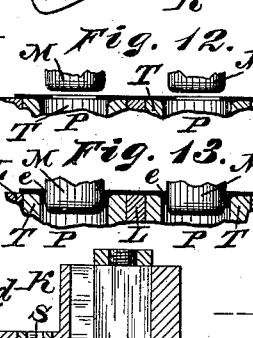
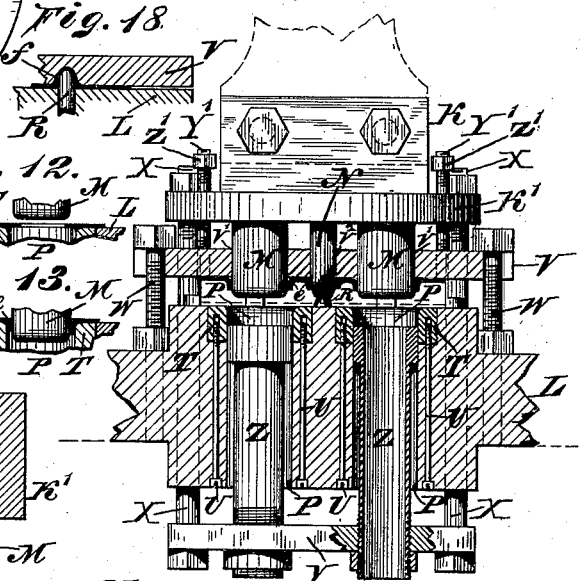
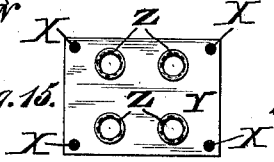
Witnesses:
A. P. Jennings
L. Douville
Inventor:
Nathan H. Davis
By Wiedersheim & Kittner
Attorneys.

(No Model.)  3 Sheets—Sheet 3.
N. H. DAVIS.
DIE FOR MAKING CAR SPRING PLATES.
No. 378,773. Patented Feb. 28, 1888.
Fig. 19.
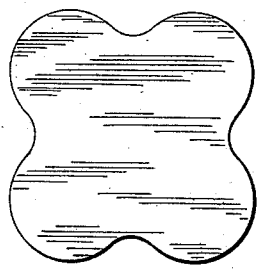
Fig. 20.
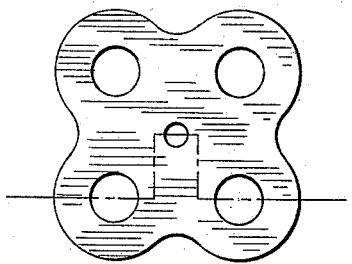
Fig. 21.
Fig. 22.
Fig. 23.
WITNESSES:
A. P. Jennings.
L. Louville
INVENTOR:
Nathan H. Davis
BY Diedersheim + Kintner
ATTORNEYS.

UNITED STATES PATENT OFFICE.

NATHAN H. DAVIS, OF PHILADELPHIA, PENNSYLVANIA.

DIE FOR MAKING CAR-SPRING PLATES.

SPECIFICATION forming part of Letters Patent No. 378,773, dated February 28, 1888.

Application filed November 14, 1887. Serial No. 255,104. (No model.)

*To all whom it may concern:*

Be it known that I, NATHAN H. DAVIS, a citizen of the United States, residing in the city and county of Philadelphia, State of Pennsylvania, have invented a new and useful Improvement in the Manufacture of Spring-Plates for Car-Springs, which improvement is fully set forth in the following specification and accompanying drawings.

My invention consists of devices for manufacturing spring-plates for car-springs, the same having openings with flanged walls for the subsequent attachment of the springs and dowels for connecting the plate with the spring plank or seat.

It also consists of plungers for flanging the openings in the spring-plate, the same yielding on its head or support when the metal shrinks, thus preventing breakage of the plates.

Figure 1:
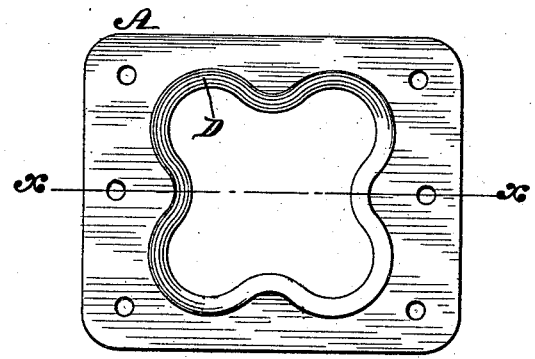
Figure 2:
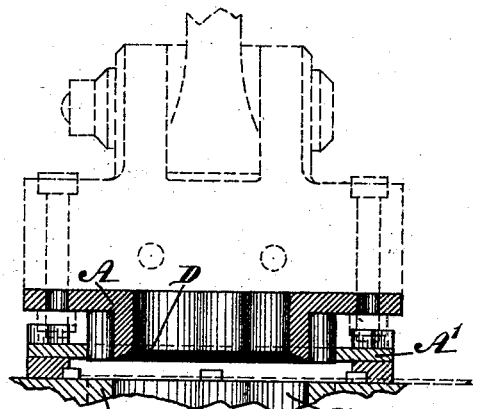
Figure 3:
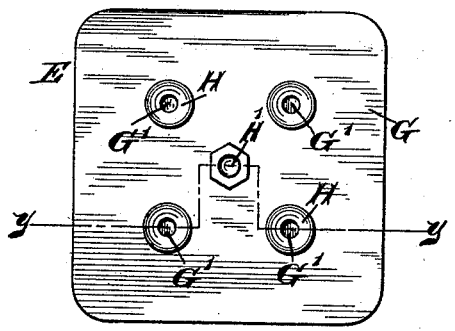
Figure 4:
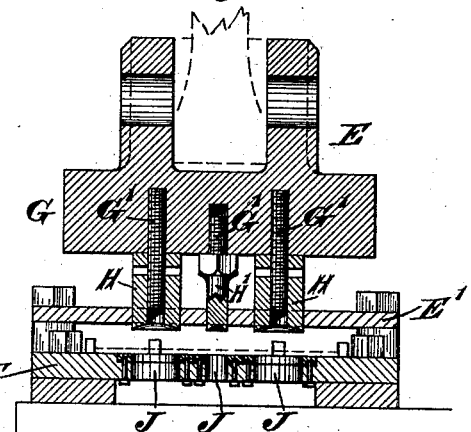
Figure 5:
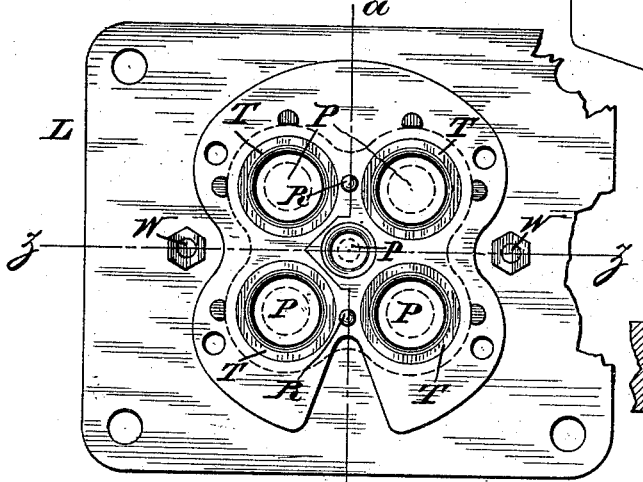
Figure 6:
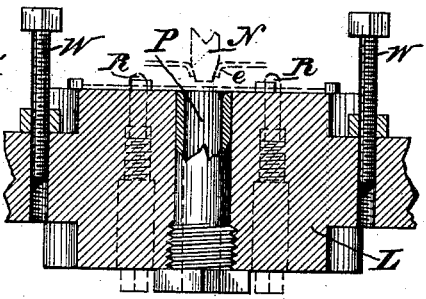

Figure 1 represents a bottom plan view of the upper die of a pair of cutting-dies embodying my invention. Fig. 2 represents a vertical section of said pair of dies in line $x\,x$, Fig. 1. Fig. 3 represents a bottom plan view of the upper die of a pair of punching-dies embodying my invention. Fig. 4 represents a vertical section of said pair of punching-dies in line $y\,y$, Fig. 3. Fig. 5 represents a top view of the lower die of the flanging and dowel-forming dies embodying my invention. Fig. 6 represents a vertical section of the lower die thereof in line $z\,z$, Fig. 5. Fig. 7 represents a vertical section of the lower die in line $a\,a$, Fig. 5. Fig. 8 represents a top or plan view of the upper die of the flanging and dowel-forming dies embodying my invention. Fig. 9 represents a vertical section thereof in line $b\,b$, Fig. 8. Fig. 10 represents a top or plan view of the stripper employed with dies Figs. 5 and 8. Fig. 11 represents a section in line $c\,c$, Fig. 10. Figs. 12 and 13 represent vertical sections showing the plungers and dies for flanging the plates. Fig. 14 represents a vertical section of the flanging and dowel-forming dies embodying my invention. Fig. 15 represents a top or plan view of the cross-head Y, Fig. 14, on a reduced scale. Fig. 16 represents a top or plan view of a modification of the flanging-dies. Fig. 17 represents a vertical section thereof in line $d\,d$, Fig. 16. Fig. 18 represents a section of a modification of the dowel-forming dies. Fig. 19 represents a plan view of the plate as primarily cut. Fig. 20 represents a plan view of the plate as punched or perforated. Fig. 21 represents a vertical section thereof. Fig. 22 represents a vertical section of the plate as flanged and formed with dowels. Fig. 23 represents a similar view of a curved plate.

Similar letters of reference indicate corresponding parts in the several figures.

Referring to the drawings, A B, Figs. 1 and 2, represent the upper and lower dies of a pair of dies for primarily punching from a plate of metal the piece from which a spring-plate is subsequently produced, the lower die, B, having an opening, C, and the upper die, A, having a cutting-edge, D, said opening and cutting-edge being of the shape of the plate to be cut.

E F represent dies for punching or piercing the plate of metal, the same consisting of a head, G, with punches H H' depending therefrom, and the bottom die having openings J to receive said punches, it being noticed that in the present case there are four large punches H and a central punch, H', of smaller diameter, the openings J corresponding to said punches. Each of the dies shown in Figs. 1, 2, 3, and 4 is provided with a stripper, as at A' E'.

K L represent dies for flanging the walls of the openings in the metal plate, and also pressing up bosses or dowels thereon. The die K has plungers M and N depending from the head K', and the die L has openings or bores P, the number and location of said plungers and openings corresponding to those of the plungers and openings of the dies E F. The die K has also dies Q depending from the head K', the same having recesses in their under face to receive the ends of the dies R, which, fitted within the die L, are of the form of pins and have their working ends project above the face of the die L, as will be seen in Fig. 7. The punches H H' are connected with the head G of the die E by means of the screws G'. The plungers M N are connected with the head K' of the die K by means of screws S. The dies Q R have their shanks screw-threaded to engage with screw-threads in the openings in the head K' and die L, respectively, whereby the said dies may be securely held in position. The upper ends of the openings P are occupied by annular bushings T, which receive the plungers M when the latter are depressed, said bushings being held in position by screws U, which are passed through the die L, and admit of the removal of the bushings when the same are worn or broken or otherwise require replacement.

Interposed between the head K' and die L is a stripper, V, having openings V' V² V³ to receive the plungers M N and dies Q, said stripper being freely fitted on vertical screws W, whose lower ends are fitted to the die L and whose heads are above said stripper.

The head K' of the die K has secured to it vertical bolts X, which pass freely through the stripper V and die L, and are connected with a cross-head, Y, below said die L. Secured to and rising from said cross-head Y are followers Z, which enter the openings P in said die L and rise and fall with the head K'. Passing freely through the head K' are bolts Y', whose lower ends are secured to the stripper, the upper ends of said bolts carrying nuts Z', against which the head K' abuts when elevated to full extent.

The plungers M depend freely from the head K', as will be seen in Fig. 9, where the heads of the fastening-screws S rest loosely in recesses in said head, by which provision said plungers M are permitted to move laterally or move toward and from each other.

In Figs. 16 and 17 the plungers are shown as fitted in enlarged openings in the head K' and held in normal positions by means of springs K², which permit the plungers to approach each other and afterward cause them to return to their normal positions.

To the under side of the stripper V are secured dies V⁴, which are adapted to stamp or mark the spring-plates with the name of the manufacturer, address, date of patent, &c.

In Fig. 18 the head of one of the dies is shown as extending in a recess in the stripper V, in which case the plungers Q may be dispensed with.

The operation is as follows: The metal plate is placed on the die B and the die A lowered, whereby the plate is cut the required shape, as shown in Fig. 19. The shaped plate is then placed on the die F and the die E lowered, whereby the punches H H' form openings in said plate, as seen in Figs. 20 and 21. The plate in hot condition is now placed on the die L, and the die K descends, whereby the plungers M N flange the walls of the respective openings in said plate, as will be seen at e in Fig. 22. The plate is also subjected to the action of the dies R Q, whereby the metal is thrown up, forming dowels f in said plate. When the head K' rises after the flanging operation of the plungers M N, the stripper K comes in contact with the head of the bolts W, thus limiting the ascent of said stripper. The head K' ascends to a greater extent, so that the plungers M N rise above the lower face of the stripper, whereby the flanged plate is cleared of said plungers. On the ascent of the head K' the cross-head Y is carried upward by the same, whereby the followers Z pass through openings or bores P in the die L, and may come in contact with the flanges of the metal plate should said flanges have stuck in said openings, whereby the plate is stripped from the face of the die L. When the plungers M descend and enter the metal plate, the latter begins to contract, whereby the flanges forcibly press said plungers inwardly. The pressure thus exerted would be transmitted toward the center of the metal plate and crack the same were it not prevented by the yielding nature of the plungers, which, as has been stated, rest freely in the head K' and are movable, thus accomplishing the object stated. The openings J of the die F are faced or occupied by bushings J', similar to those of the die L and for similar purposes.

For making a curved plate, as in Fig. 23, the stripper V and face of the lower die L will be correspondingly curved.

Having thus described my invention, what I claim as new, and desire to secure by Letters Patent, is—

1. The cutting-dies A B and the punching-dies E F, combined substantially as described.

2. The head G, with punches H and the central punch, H', and the die F, having openings J for said punches, combined substantially as described.

3. The flanging-die K, having plungers M N, and the die L, having openings P for said plungers, substantially as described.

4. The die K, having dies Q, and the die L, having dies R, for forming dowels in the spring-plate, substantially as described.

5. The die having removable bushings in the openings thereof, substantially as described.

6. The dies provided with bushings and screws for removably holding the same in position, substantially as described.

7. The head K', having plungers, and the die L, having openings for flanging purposes, in combination with the stripper V, interposed between said head and die, substantially as described.

8. In a die, a stripper, in combination with the screws W, which are connected with said die and have said stripper freely fitted to them, substantially as described.

9. The die K, having bolts X secured to its head K' and passed freely through the stripper V, and die L, in combination with the cross-head Y, which is connected with said head K', and carrying followers which enter the working-openings of the die L, substantially as described.

10. The dies K L and stripper V, in combination with the bolts W, freely connected with the stripper and secured to the die K, and bolts Y', which are secured to said stripper and passed freely through the head K' of said die K, the upper end of said bolts Y' having nuts Z', against which the head K' abuts when fully elevated, substantially as described.

11. A die or head having plungers which are movably connected therewith and adapted to yield laterally, substantially as described.

12. A die having a plunger freely fitted in an opening, thus permitting said plunger to move laterally when the plate operated upon contracts, substantially as described.

NATHAN H. DAVIS.

Witnesses:
JOHN A. WIEDERSHEIM,
JOHN K. PLITT.